SR
12-30-75 XR 3,930,147

United States Patent [19]
Bellanger et al.

[11] 3,930,147
[45] Dec. 30, 1975

[54] TIME MULTIPLEXED DIGITAL FILTER

[75] Inventors: Maurice Georges Bellanger, Antony; Guy Pierre Lepagnol, Sceaux, both of France

[73] Assignee: Telecommunications Radioelectriques et Telephoniques T.R.T., Paris, France

[22] Filed: May 13, 1974

[21] Appl. No.: 469,533

[30] Foreign Application Priority Data

May 11, 1973 France .................... 73.17164

[52] U.S. Cl. .............. 235/156; 324/77 H; 325/42
[51] Int. Cl.[2] .............................. G06F 7/38
[58] Field of Search ............ 235/156, 152, 181; 324/77 H; 325/42

[56] References Cited

UNITED STATES PATENTS

| | | | |
|---|---|---|---|
| 3,629,509 | 12/1971 | Glaser | 179/15 A |
| 3,633,105 | 4/1972 | Lender et al. | 325/42 |
| 3,714,402 | 1/1973 | Baumwolspiner | 235/152 |
| 3,717,756 | 2/1973 | Stitt | 235/156 X |

*Primary Examiner*—David H. Malzahn
*Attorney, Agent, or Firm*—Frank R. Trifari; Daniel R. McGlynn

[57] ABSTRACT

A time multiplexed digital filter including a coefficient generator, a delay device, a multiplier, and an adder, having an AND-gate switch in the adder/delay device loop for controlling the recursive input to the adder.

9 Claims, 8 Drawing Figures

TIME MULTIPLEXED DIGITAL FILTER

The invention relates to a digital filter input to which is applied a sequence of numbers of frequency K/T resulting from time multiplexing of K elementary sequences the filter produces a sequence of output numbers of frequency K/T resulting from time multiplexing of K elementary sequences, each output number being the sum of N incoming numbers of an elementary sequence multiplied by given coefficients stored in a circulating coefficient memory.

In the particular case in which K = 1 the digital filter processes a single sequence of numbers coming in at the frequency of 1/T.

The invention also relates to digital filters of recursive or non-recursive type essentially formed by arithmetic apparatus of the type disclosed by Gold and Radar in "Digital Processing of Signals" (Mc Graw-Hill Book Co. 1969). For example, a digital filter of the non-recursive type employed for filtering K analog signals is formed by an arithmetic device of the aforesaid type, in which the incoming numbers are the time-multiplexed, encoded samples of the K analog signals in which the multiplication coefficients are the same values of the impulse response corresponding to the filtering function to be obtained, which may be different for each analog signal. The output numbers are the encoded samples of the filtered K signals. If the non-recursive digital filter is employed for filtering an analog signal (K = 1), the arithmetical device processes a sequence of incoming numbers representing the encoded samples of the analog signal.

French Pat. No. 2,055,908 issued on Aug. 6, 1969 discloses a non-recursive, digital filter employed for filtering an analog signal, in which each encoded sample of the signal is simultaneously multiplied by the coefficients in a plurality of multipliers, the resultant products being applied to one input of a plurality of adders, the other input and the output of said adders connecting in series a plurality of shift registers, each of which constitutes a delay circuit. Each partial sum of products obtained in each register is transferred to the next register and added to the contents of that register at the rate of the incoming samples so that at the output of the last register complete sums are obtained, each of which corresponds to the value of a filtered sample.

U.S. Pat. No. 3,665,171 discloses a non-recursive filter of the same type, more particularly appropriate for filtering a plurality of analog signals, the encoded samples of which are time-multiplexed.

In this type of digital filter the use of a cascade connection of a plurality of shift registers with the aid of two-input adders to form the sum of the products of the samples and the coefficients avoids the use of a multiple input adder, which is usually employed but which is costly to manufacture. However integration of digital filters on a surface of a semiconductor substrate is different due to the large number of required elementary circuits, since the number of multipliers, adders and shift registers is equal to the number of coefficients. In addition, logical circuits are associated with each shift register. Moreover a prohibitively large surface area is occupied by the connections between there circuits. In particular, the cascade connection of the registers and adders the register outputs and the connections occupy a large surface area as compared with the useful surface area of the registers.

It is an object of the invention to provide a novel digital filter comprising a minimal number of elementary circuits and connections in order to permit implementation of the filter circuit on an integrated circuit semi-conductor.

According to the invention the digital filter comprises a multiplier, one input of which is connected to a memory for storing one incoming number and the other input of which is connected to the coefficient memory, the output of the multiplier being connected to a first input of an adder, the second input and the output of which are connected to the output and to the input of a delay circuit producing a delay $\theta = T/K(N+1)$, the loop formed by the adder and the delay circuit comprising a switching circuit for opening the loop and for connecting a terminal of the open loop to the output of the numerical filter, the operation of the filter being controlled by two control-signals of periods T/K, the control signals producing in each period N+1 control pulses of duration $\theta$, one of the control signals controlling the coefficient memory and the incoming number storing memory, the multiplier successively producing in each period T/K one product which is equal to zero, and N products resulting from the multiplication of one incoming number of a sequence of incoming numbers and N coefficients the other of control signals controling the opening of the said loop for a duration $\theta$ in each period T/K.

This digital filter permits design of a non-recursive filter which, in contrast to the prior art filters, comprises a single multiplier, a single adder and a single delay circuit without intermediate tappings with a minimum number of logical circuits, which facilitates its integration on a semiconductor.

The invention will now be described more fully with reference to the accompanying drawings.

Figure 1:
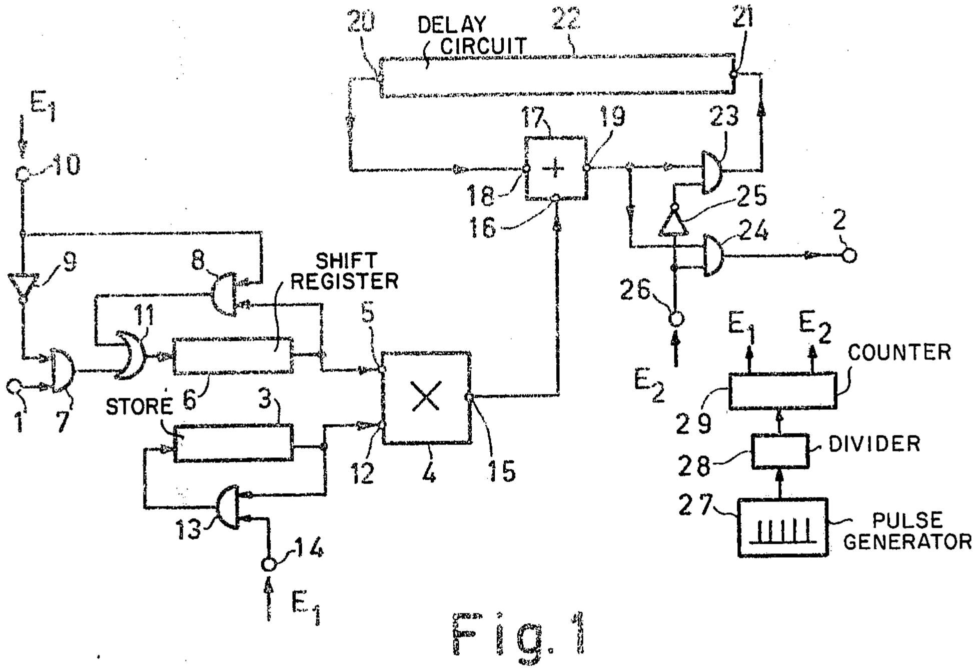
FIG. 1 shows schematically one embodiment of the device in accordance with the invention.
Figure 2:
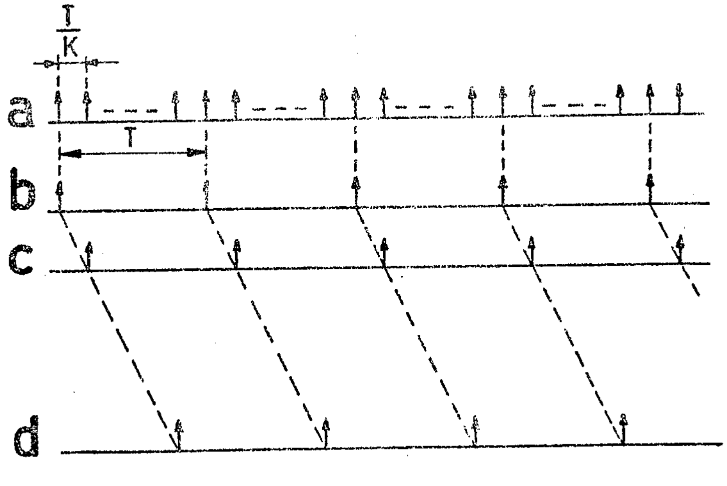
FIG. 2 illustrates the time division of the digits entering the digital filter.

To the input 1 of the digital filter shown in FIG. 1 is applied a sequence of digits of the frequency K/T. FIG. 2 illustrates at *a* the time division of these digits, each digit being represented by an arrow. This sequence results from time-multiplexing K elementary sequences of incoming digits of the frequency 1/T in each sequence. FIG. 2 illustrates at *b*, *c*, *d* the digits of elementary sequences 1, 2, . . . K. Any digit entering at 1 may be represented by the notation $A_i^j$, in which *j* is the number of the elementary sequence with which it is associated and *i* is the number of the digit in said elementary sequence.

This digital filter has to supply at its output 2 a sequence of digits of the frequency K/T resulting from time-multiplexing K elementary sequences of output digits of the frequency 1/T in each sequence. Each output digit is the sum of N incoming digits of an elementary sequence, each multiplied by given coefficients registered in a coefficient store 3. On the basis of the above defined notation each output digit $\tau$ is obtained from the operation:

$$\tau = \sum_{i=1}^{N} A_i^j a_i^j \qquad (1)$$

wherein $a_i^j$ represents the coefficients corresponding to the incoming digit $A_i^j$.

From the above appears the calculation to be carried out in a non-recursive numerical filter, to the input of which are applied encoded samples of K analogue time-multiplexe signals. The encoded samples are the digits $A_i^j$ and the coefficients $a_i^j$ are the sample values of the pulse responses corresponding to the filtering function to be obtained for the K analogue signals.

In the particular case of a digital filter to which is inputted a single sequence of digits of the frequency 1/T, it is not useful to include the exponent $j$ in formula (1). This case corresponds to a non-recursive digital filter for filtering a single analog signal.

With non-recursive, digital filters it is often required to use a number N of coefficients, which may be high (several tens) and in this case the prior art arithmetical devices operating on formula (1) are complicated and costly to manufacture. Reference is made to French Pat. No. 2,055,908 and U.S. Pat. No. 3,665,171, where technique of the formation of a partial sum in registers is used in order to form the complete sum of formula (1). With this technique the use of a multi-input adder is avoided, but the large number of required elementary circuits and of the connections between said circuits is prohibitive for large scale integration on the surface of a semiconductor.

The digital filter according to FIG. 1 avoids this drawback. This device comprises a multiplier 4 preferably of the series type, for minimizing the number of connections. In the following description it will be assumed that all arithmetical circuits are of the series type, which means that at any point of the device all digits appear with the binary elements in series. To the input 5 of the multiplier are applied the digits entering at 1 through the store 6. This store 6 is a shift register, the capacity of which corresponds to an incoming digit and with which several gates are associated. The AND-gates 7 and 8 pass complementary values (due to the inverting circuit 9) of the control-signal applied to the control-terminal 10. When this control-signal is "0", gate 7 is conducting and the digits entering at 1 are applied to the input of register 6 via the OR-gate 11. When the control-signal is "1", gate 8 is conducting, the output of register 6 is coupled with its input and the binary elements of the digit appear in series at the input 5 of the multiplier. The other input 12 of the multiplier 4 is connected to the coefficient store 3, which is a shift register in which the coefficients are stored. When the AND-gate 13 is rendered conducting by a signal "1" applied to the control-input 14, the coefficients are applied one after the other to the input 12 of the multiplier 4, their binary elements being in series.

The output 15 of the multiplier 4 is connected to a first input 16 of the adder 17, the second input 18 and the output 19 of which are connected to the output terminal 20 and to the input terminal 21 respectively of the delay circuit 22. This circuit 22 may be a shift register applying to the digit at its input a delay differing by T from a duration $$\Theta = \frac{T}{K} \cdot \frac{1}{N+1},$$

for a given N.

The loop formed by the delay circuit 22 and the adder 17 includes an inverter switching circuit formed by the AND-gates 23 and 24, which pass complementary values (owing to the inverter circuit 25) of the signal applied to the control-terminal 26. When the gate 23 is conducting, the loop is closed. When the gate 23 is cut off, the loop is open between the terminals 19 and 21 and the conducting gate 24 connects the output 19 of the adder to the output 2 of the numerical filter.

The operation of the digital filter is governed by two control-signals $E_1$ and $E_2$ of periods T/4 having in each period N+1 logical vlaues of a duration $\theta$=T/K·1/N+1. These control-signals have a shape which will be defined hereinafter. They are derived, for example, from a clock pulse generator 27 by means of a frequency divider 28, which supplies pulses of a frequency $1/\theta$. These pulses are applied to the modulo (N+1) counter 29 provided with decoding circuits suitable for the control-signals to be obtained.

The first control-signal $E_1$ is applied to the terminals 10 and 14 for controlling the extraction of each digit contained in register 6 and the extraction of the coefficients in register 3 so that the multiplier 4 successively supplies at its output 15 within each period T/K a product O and then N products of an incoming digit $A_i^j$ of a sequence $j$ and of the N coefficients $a_i^j$ corresponding to said sequence $j$. The second control-signal $E_2$ is applied to the terminal 26 in order to control the inverter switching circuit (23, 24, 25) so that the loop (22, 17) is opened for a duration $\theta$ in each period T/K.

It will now be shown that in this way 2 the output digits resulting from the operation defined by formula (1) are obtained at the terminal 2.

For a good understanding the simplest case will be considered, i.e. K = 1, which means that the digit at the input 1 constitutes a single sequence of the frequency 1/T, which corresponds to a non-recursive filter intended for filtering a single analog signal. For the sake of clarity it will be assumed that the digital filter has to supply the sum of only N = 3 incoming digits, for example, 3 digits $A_1$, $A_2$, $A_3$ multiplied by the coefficients $a_1$, $a_2$ and $a_3$ respectively. With the aid of the various diagrams of FIG. 3 it will be investigated how at the output 2 is obtained the desired digit $Y_1$ resulting from the operation:

$$Y_1 = A_1a_1 + A_2a_2 + A_3a_3. \qquad (2)$$

The diagram 3a represents the first control-signal $E_1$, which is applied to the terminals 10 and 14. In the case under consideration, in which K = 1, this signal has the period T. In each of these periods this control-signal $E_1$ assumes four logical values of a duration $\theta$ =T/4. For the duration T/4 of the first logical value the control-signal $E_1$ has the value "0" so that as stated above each digit entering at 1 is introduced in series into register 6. In particular the digits $A_1$, $A_2$, $A_3$ are introduced during the first time interval T/4 of the periods referenced $T_1$, $T_2$, $T_3$ respectively.

For the duration 3T/4 of the three logical further values of each period the control-signal $E_1$ is "1". Consequently, on the one hand for the duration 3T/4 appears each digit entering register 6 three times in the series form at the input 5 of the multiplier 4. FIG. 3*b* illustrates these intervals 3T/4 and, in particular, the intervals during which appear the digits $A_1$, $A_2$, $A_3$.

On the other hand during each of the same intervals 3T/4 appear successively the three coefficients $a_1$, $a_2$, $a_3$ in series at the input 12 of the multiplier 4. FIG. 3*c* shows the intervals T/4, during which appear the coefficients $a_1$, $a_2$, $a_3$ respectively. It will be apparent from the following that the order of appearance of these coefficients is important, $a_1$ lags behind $a_2$, which in turn lags behind $a_3$. FIG. 3*c* furthermore shows that in between the intervals of appearance of the coefficients the digit appears at the input 12 of the multiplier 4.

On the basis of the digits and the coefficients applied to its inputs (FIG. 3*b* and 3*c*) the multiplier 4 thus forms in the course of each period T a product O, and then three products of the digits and the three coefficients $a_1$, $a_2$, $a_3$. It is assumed that the multiplier 4 requires for multiplication a time T/4 so that each product appears at the output 15 of the multiplier with a delay of T/4 with respect to the instants at which the factors of this product appear at the inputs of the multiplier. Takings this delay into account the solid lines of FIG. 3*d* indicate the so-called multiplication time intervals during which the products of the digits and of the three coefficients $a_1$, $a_2$, $a_3$ appear at the first input 16 of the adder 17. Between these multiplication intervals the digit "0" indicates that the product is zero. There are first provided in particular a first interval $\tau_o$, during which the product is zero and subsequently the intervals $\tau_1$, $\tau_2$, $\tau_3$, during which the products $p_1=A_1a_1$, $p_2=A_2a_2$, $p_3 = A_3a_3$ appear, the sum of which has to be formed in accordance with formula (2) and finally the interval $\tau_o'$ after $\tau_3$, during which the product is zero. The intervals $\tau_0$, $\tau_1$, $\tau_2$, $\tau_3$, $\tau_0'$ are relatively shifted over 3T/4.

FIG. 3*e* illustrates the secoond control-signal $E_2$ applied to the control-terminal 26 of the switching-inverting circuit (23, 24, 25). This control-signal of the period T assumes in each period four logical values of a duration T/4. During the duration T/4 of the logical value, which coincides with the intervals of FIG. 3*d*, where the product is zero, the second control-signals is "1": the output 19 of the adder is disconnected from the input 21 of register 22 and connected to the output 2 of the digital filter. During the time 3T/4 of the three following logical values, which coincide with the multiplication intervals, the second control-signal is "0" and the output 19 of the adder is connected to the input 21 of the register 22.

The digital filter is capable of operating with a register 22 producing a delay $\tau$ equal to T−T/N+1 or T+T/N+1. In the present case, taking into account the digit $Y_1$ to be obtained and the order of appearance of the coefficients $a_1$, $a_2$, $a_3$ this delay $\tau$ has to be equal to T − T/N + 1 or 3T/4.

Taking into account the action of the second control-signal $E_2$ of FIG. 3e and of the duration 3T/4 produced by the register 22, FIG. 3f indicates the digits appearing at the second input 18 of the adder during the aforesaid time intervals $\tau_0$, $\tau_1$, $\tau_2$, $\tau_3$, $\tau_0'$. During the same time intervals, as shown in FIG. 3g, digits appear at the output 19 of the adder and FIG. 3h shows the digits appearing at the input 21 of register 22.

During the interval $\tau_0$, as will be apparent from the following, there appears at the second input 18 and at the output 19 of the adder an output digit of the digital filter designated by $$\sum_1^3 p_i,$$

corresponding to three preceding incoming digits (FIG. 3*f* and 3*g*). During this interval $\tau_0$ there appears at the input 21 of register 22 the digit "0" (FIG. 3*h*) since this input is disconnected from the output 19 of the adder.

Owing to the delay 3T/4 produced by register 22 the digit "0" appearing during the interval $\tau_0$ at the input 21 of the register will appear during the interval $\tau_1$ at the second input 18 of the adder (FIG. 3*f*). During this interval $\tau_1$ there appears consequently at output 19 of the adder the digit $p_1$ (FIG. 3*g*) resulting from the sum of the digit $p_1$ at the first input (FIG. 3*d*) and the digit "0" at the second input. Since the second control-signal $E_2$ is "0" (FIG. 3*e*) the digit $p_1$ appears simultaneously at the input 21 of the register (FIG. 3*h*).

Owing to the delay 3T/4 produced by register 22 this digit $p_1$ appears during the interval $\tau_2$ at the second input 18 of the adder (FIG. 3*f*). During this interval $\tau_2$ there consequently appears at the output 19 of the adder the digit $p_1 + p_2$ (FIG. 3*g*) resulting from the sum of the digit $p_2$ at the first input (FIG. 3*d*) and the digit $p_1$ at the second input. Since the second control-signal $E_2$ is "0" (FIG. 3*e*) the digit $p_1 + p_2$ appears simultaneously at the input 21 of the register (FIG. 3*h*).

Similarly this digit $p_1 + p_2$ appears during the interval $\tau_3$ at the second input 18 of the adder (FIG. 3*f*). During this interval $\tau_3$ there appears at the output of the adder the digit $p_1 + p_2 + p_3$ (FIG. 3*g*) resulting from the sum of the digit $p_3$ at the first input (FIG. 3*d*) and the digit $p_1 + p_2$ at the second input. This digit $p_1 + p_2 + p_3$ appears simultaneously at the input 21 of the register (FIG. 3*h*).

This digit $p_1 + p_2 + p_3$ formed during the interval $\tau_3$ represents the digit $Y_1$ of formula (2), which is desired at the output 2 of the digital filter. It propagates across register 22 and appears after a delay 3T/4 during the interval $\tau_o'$ at the second input 18 of the adder (FIG. 3f). Since during this interval $\tau_o'$ the digit at the first input 16 of the adder is "0" (FIG. 3*d*), the digit $p_1 + p_2 + p_3$ also appears at the output 19 of the adder (FIG. 3g). Since during the interval $\tau_o'$ the second control-signal $E_2$ is "1", the desired output digit $p_1 + p_2 + p_3$ appears at the output 2 of the numerical filter. This is illustrated with respect to the interval $\tau_o'$ of the second control-signal (FIG. 3*e*). At the same time the digit at the input 21 of the register is "0" (FIG. 3*h*).

The above explanation of the appearance of the output digit $p_1 + p_2 + p_3$ at the output 2 of the digital filter during the interval $\tau_o'$ applies, of course, to any interval in which the second control-signal is "1", the output digits $$\sum_1^3 p_i$$

obtained corresponding to other sequences of three successively incoming digits. FIG. 3*e* shows these output digits for all intervals in which the second control-signal is "1".

At the output 2 of the digital filter there may likewise be obtainable a desired digit $p_1 + p_2 + p_3$ formed during the interval $\tau_3$ whilst this digit travels across register 22, that is to say during the time interval between the intervals $\tau_3$ and $\tau_o$.

The switching circuit (23, 24, 25) has then to be included in register 22 and actuated by a second control-signal $E_2$. It may in particular be advantageous to obtain the digits at the output 2 of the digital filter synchronously with the digits appearing at the input without a delay T/4 as is the case in the digital filter shown in FIG. 1.

Figure 3:
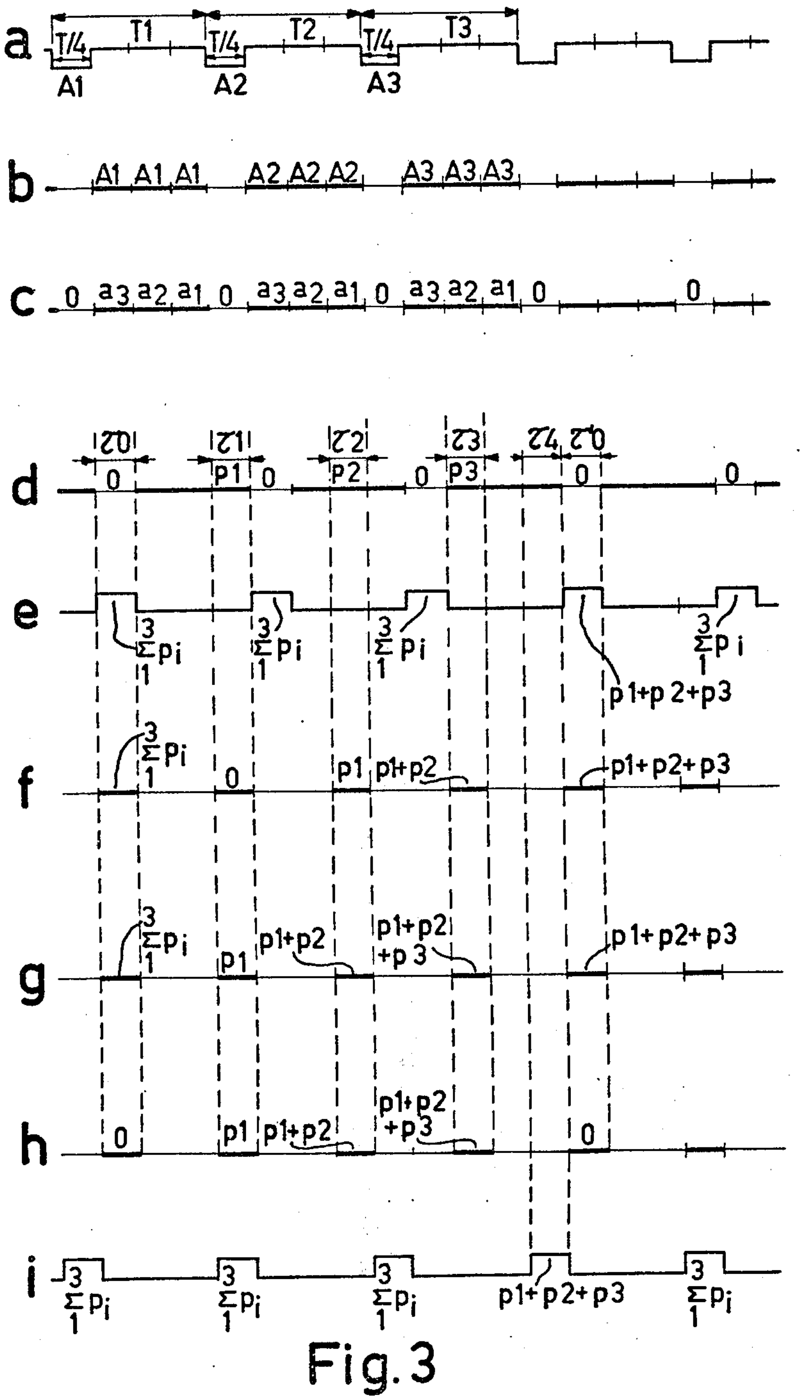
FIG. 3 shows diagrams illustrating the operation of the device shown in FIG. 1.
Figure 4:
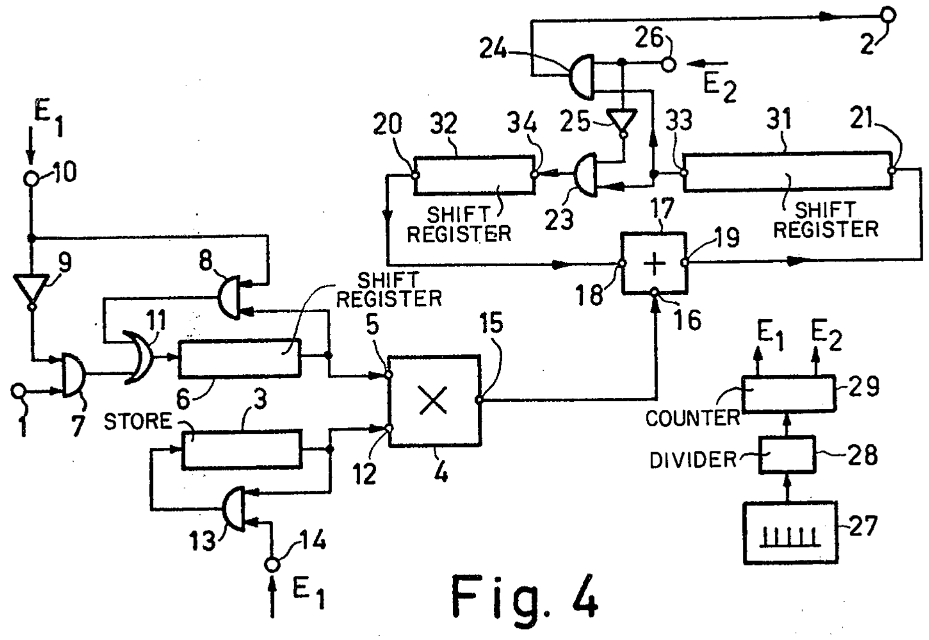
FIG. 4 shows schematically a further embodiment of the device in accordance with the invention.

The diagram of the digital filter corresponding to this variant is shown in FIG. 4, in which the elements already shown in FIG. 1 are designated by the same references. The sole difference from FIG. 1 consists in the disposition of the switching-inverting circuit (23, 24, 25 in the loop formed by the adder 17 and the delay circuit. As shown in FIG 4, the output 19 and the second input 18 of the adder 17 are directly connected to the input 21 and to the output 20 of a delay circuit replacing the register 22 of FIG. 1 and formed in this case by two portions i.e. registers 31 and 32 connected in cascade with the aid of the switching-inverting circuit (23, 24, 25). The overall delay produced by the cascade circuit of registers 31 and 32 is equal to that produced by register 22 of FIG. 1 that is to say 3T/4. This overall delay 3T/4 is divided among registers 31 and 32 so that register 31 produces a delay 2T/4 and register 32 a delay T/4. In accordance with the positions of the switching-inverting circuit (23, 24, 25) between the two registers 31 and 32 having said delay, the second control-signal $E_2$ shown in FIG. 3i is employed for actuating said switching-inverting circuit. This signal $E_2$ leads by T/4 with respect to that of FIG. 3*e* employed in the digital filter of FIG. 1. When the second control-signal of FIG. 3*i* is "0", the switching-inverting circuit (23, 24, 25) connects the output 33 of register 31 to the input 34 of register 32. When this second control-signal is "1", the output 33 of register 31 is connected to the output 2 of the digital filter.

If the same first control-signal $E_1$ as that shown in FIG. 3*a* is used for the numerical filter of FIG. 4, the first input of the adder 17 has the same products during the same intervals as those illustrated in FIG. 3*d*. Since the overall delay 3T/4 produced by the cadcade connection of registers 31 and 32 is the same as that produced by register 22 of FIG. 1, the output 19 of the adder 17 has the same digits during the same intervals as those shown in FIG. 3*g*. Particularly during the interval $\tau_3$ the digit $p_1 + p_2 + p_3$ forming the desired output digit appears at the input 21 of register 31. Owing to the delay T/4 produced by register 31 this digit $p_1 + p_2 + p_3$ appears at the output 33 of register 31 during the interval $\tau_4$ delayed by 2T/4 with respect to the interval $\tau_3$. Therefore, during this interval $\tau_4$ the second control-signal of FIG. 3*i* is "1" and the desired digit $p_1 + p_2 + p_3$ is directed by the switching-inverting circuit (23, 24, 25) to the output 2 of the digital filter. This is indicated by $p_1 + p_2 + p_3$ for the interval $\tau_4$ of FIG. 3*i*. For all other intervals in which the second control-signal is "1" other output digits are obtained, designated by $$\sum_{1}^{3} p_i.$$

A comparison between FIGS. 3*a* and 3*i* will show that the digits at the output 2 of the digital filter of FIG. 4 appear in synchronism with the digits appearing at the input 1.

So far the operation of the digital filters of FIGS. 1 and 4 is described with a register 22 or a cascade connection of registers 31 and 32 producing a delay $\tau = T - T/N + 1$ or $3T/4$ in the present example in which $N = 3$. The same output digit may also be obtained by a delay $\tau = T + T/N + 1$ or $5T/4$ in the present example, in which $N$=3. However, in this case the coefficients stored in register 3 have to be applied to the input 12 of the multiplier in the inverse order.

Figure 5:
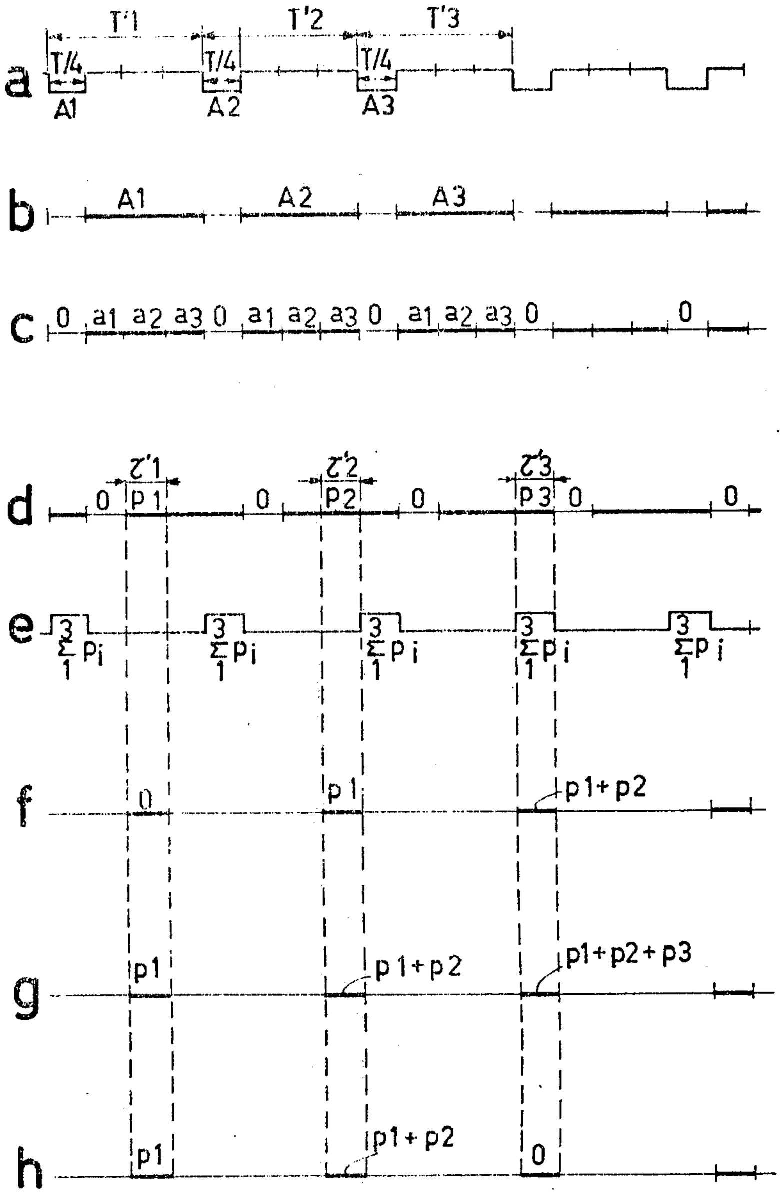
FIG. 5 shows diagrams illustrating the operation of the device shown in FIG. 4.

For this case the operation of a device as shown in FIG. 1 will be explained with the aid of the diagrams of FIG. 5 plotted in accordance with those of FIG. 3 so that the diagrams 5*a* to 5*h* supply the same indications as the diagrams 3*a* to 3*h*.

It will be shown that for three incoming digits $A_1$, $A_2$, $A_3$ the output digit of formula (2): $Y_1 = A_1a_1 + A_2a_2 + A_3a_3$ is obtained with a delay 5T/4 produced by register 22.

The diagram 5*a* shows the first control-signal $E_1$ and the width intervals $T_4$ associated with the period $T'_1$, $T'_2$, $T'_3$, during which the digits $A_1$, $A_2$, $A_3$ are introduced into the register 6.

Diagram 5*b* shows the intervals during which the digits $A_1$, $A_2$, $A_3$ appear at the input 5 of multiplier 4.

Diagram 5*c* shows the intervals during which the coefficients $a_1$, $a_2$, $a_3$ appear at the input 12 of multiplier 4. These coefficients appear in the order inverted with respect to that of the corresponding FIG. 3*c*.

Diagram 5*d* shows the multiplication intervals during which at the first input 16 of the adder 17 appear the products of the digits and the coefficients $a_1$, $a_2$, $a_3$. Between these multiplication intervals the digit at this first input 16 is "0". Within the multiplication intervals are indicated the intervals $\tau'_1$, $\tau'_2$, $\tau'_3$, during which at the first input 16 of the adder appear the products $p_1 = A_1a_1$, $p_2 = A_2a_2$, $p_3 = A_3a_3$, the sum of which has to be obtained. Since the coefficients do not appear in the same order as before at the input 12 of the multiplier 4, it will be obvious that the intervals $\tau'_1$, $\tau'_2$, $\tau'_3$ are not disposed in the same manner as the corresponding intervals $\tau_1$, $\tau_2$, $\tau_3$ of FIG. 3*d*. These intervals $\tau'_1$, $\tau'_2$, $\tau'_3$ are relatively shifted by 5T/4.

Diagram 5e shows the second control-signal $E_2$. The width inteervals T/4 during which said signal $E_2$ is "1" coincide with the intervals shown in FIG. 5*a*, in which the incoming digits are introduced into register 6.

Diagrams 5*f*, 5*g*, 5*h* show during the intervals $\tau'_1$, $\tau'_2$, $\tau'_3$ the digits appearing at the second input 18 of adder 17, at the output 19 of adder 17 and at the input 21 of register 22 respectively.

During the interval $\tau'_1$ the digit "0" (FIG. 5*f*) appears at the second input 18 of adder 17. In fact, during a former interval (not shown) advancing by 5T/4 with respect to the interval $\tau'_1$ the second control-signal $E_2$ of FIG. 5*e* had the value "1" and therefore the input 21 of register 22 was disconnected from the output 19 of the adder. The digit "0" appearing therefore during this preceding interval at the input 21 of register 22 will thus appear after a delay 5T/4 produced by the register, that is to say during the interval $\tau'_1$.

It will be apparent that at the output 19 of the adder the digit $p_1$ + "0" = $p_1$ (FIG. 5*g*) appears during the interval $\tau'_1$. The digit $p_1$ appears simultaneously at the input 21 of the register (FIG. 5*h*).

The digit $p_1$, delayed by 5T/4 by the register, appears at the second input 17 of the adder during the interval $\tau'_2$ (FIG. 5*f*). At the same time the digit $p_1 + p_2$ appears at the output 19 of the adder (FIG. 5*g*) and at the input 21 of the register (FIG. 5*h*).

The digit $p_1 + p_2$, delayed by 5T/4 by the register 22, appears at the second input 18 of the adder during the time interval $\tau'_3$ (FIG. 5*f*). At the same time the digit $p_1 + p_2 + p_3$ appears at the output 19 of the adder (FIG. 5). Since during this time interval $\tau'_3$ the second control-signal $E_2$ is "1", this digit $p_1 + p_2 + p_3$ is directed by the switching-inverting circuit (23, 24, 25) to the output 2 of the digital filter. In this way the desired output digit relating to the input digit $A_1$, $A_2$, $A_3$ is obtained at said output 2.

With all other intervals in which the second control-signal $E_2$ is "1", output digits $$\sum_{1}^{3} p_i$$

relating to other sequences of three incoming digits are obtained at the output 2. A comparison between FIGS. 5*a* and 5*e* will show that the output digits of the digital filter are produced in synchronism with the incoming digits.

It can be shown that the digital filter shown in FIG. 4 may equally be used with a cascade connection of the two registers 31 and 32 producing a delay of 5T/4. However, in this case the synchronism between the incoming digits and the output digits of the device of FIG. 1 is no longer ensured.

The diagrams of the digital filters shown in FIGS. 1 and 4, the operation of which is described in simplified form for obtaining the sum of N = 3 incoming digits multiplied each by coefficients, are the same for any value N. On the one hand only the frequency of the calculations, which is the inverse of the duration of the logical values of the control-signals $E_1$ and $E_2$ and on the other hand the delay produced by the register(s) of the loop vary. In general the frequency of calculation is $(N+1)/T$ and the delay is $T - T/(N+1)$ or $T + T/(N+1)$.

In the non-recursive digital filter, the pulse response of which is symmetrical, it is known that an operation of the type $$\sum_{i=1}^{N} a_i\,(A_i + A - i) \qquad (3)$$

has to be carried out.

This formula (3) shows that on an assembly of 2N incoming digits $A_i + A_{-i}$ one half $A_i$ has to be multiplied by the same coefficient $a_i$ as the other half $A_{-i}$. In order to carry out the operation (3) a first solution not taking into account the identity of the coefficients consists in using a digital filter as shown in FIGS. 1 or 4, whilst considering that each sequence of 2N incoming digits has to be multiplied by 2N coefficients. The frequency of the calculations would then be $(2N + 1/T)$.

Figure 6:
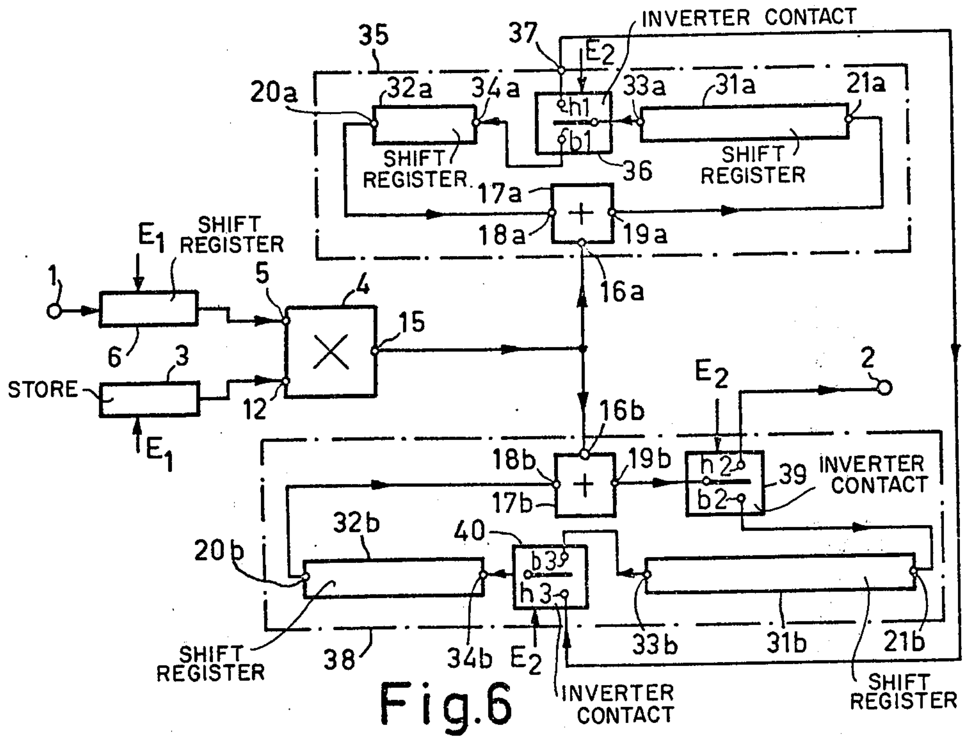
FIG. 6 illustrates a digital filter embodying the invention suitable for use in symmetrical pulse response filters.

The digital filter shown in FIG. 6 permits of carrying out the operation (3) with a calculation frequency reduced to $(N + 1/T)$. This device combined two arithmetical devices of the analog type shown in FIGS. 1 or 4, one of which is provided with a loop in which a delay $T - T/N + 1$ is produced, while the other is provided with a loop in which a delay of $T + T/N + 1$ is produced. For the same of simplifying the explanation the diagram of FIG. 6 is drastically simplified. The elements already shown in FIGS. 1 and 3 are designated by the same references.

The assembly of the multiplier 4 and the stores connected to the inputs thereof is completely similar to that shown in FIGS. 1 and 4. This assembly is shown in a simplified form in FIG. 6 in order to show that the first control-signal $E_1$ permits the extraction of the incoming digits and of the coefficients of the stores 6 and 3 for application to the inputs of the multiplier 4.

The output 15 of the multiplier is connected to the first input 16*a* of the adder 17*a*. The second input 18*a* and the output 19*a* of said adder are connected to the output terminal 20*a* and input terminal 21*a* of the cascade connection of the two registers 31*a* and 32*a* in order to form a first loop 35. As in the diagram of FIG. 4 a switching-inverting circuit shown in the form of an inverter contact 36 is provided between said two registers. This inverter contact is governed by the second control-signal $E_2$. According as the signal $E_2$ is "0" or "1", the contact 36 is in the position $b_1$ or $h_1$ and the output 33*a* of register 31*a* is directed to the input 34*a* of register 32*a* or to the output terminal 37 of the first loop 35.

The output 15 of the multiplier 4 is furthermore connected to the first input 16*b* of the adder 17*b*. The second input 18*b* and the output 19*b* of this adder are connected to the output terminal 20*b* and the input terminal 21*b* of a delay circuit formed by the cascade connection of two registers 31*b* and 32*b* in order to form a second loop 38. As in the diagram of FIG. 1, an inverter contact 39 is provided between the output 19*b* of the adder 17*b* and the input 21*b* of the delay circuit of the loop 38. This inverter contact is governed by the second control-signal $E_2$. According as this signal $E_2$ is "0" or "1", the inverter contact 39 is in the position $b_2$ or $h_2$ and the output 19*b* of the adder 17*b* is directed to the input 21*b* of the delay circuit or to the output terminal 2 of the digital filter.

Moreover, a connection is provided between the two loops 35 and 38 via the inverter contact 40 arranged between the two registers 31*b* and 32*b*. This inverter contact 40 is governed by the second control-signal $E_2$. According as this signal $E_2$ is "0" or "1" the inverter contact is in the position $b_3$ or $h_3$ and the input 34*b* of register 32*b* is connected to the output 33*b* of register 31*b* or to the output 37 of the first loop 35.

Figure 7:
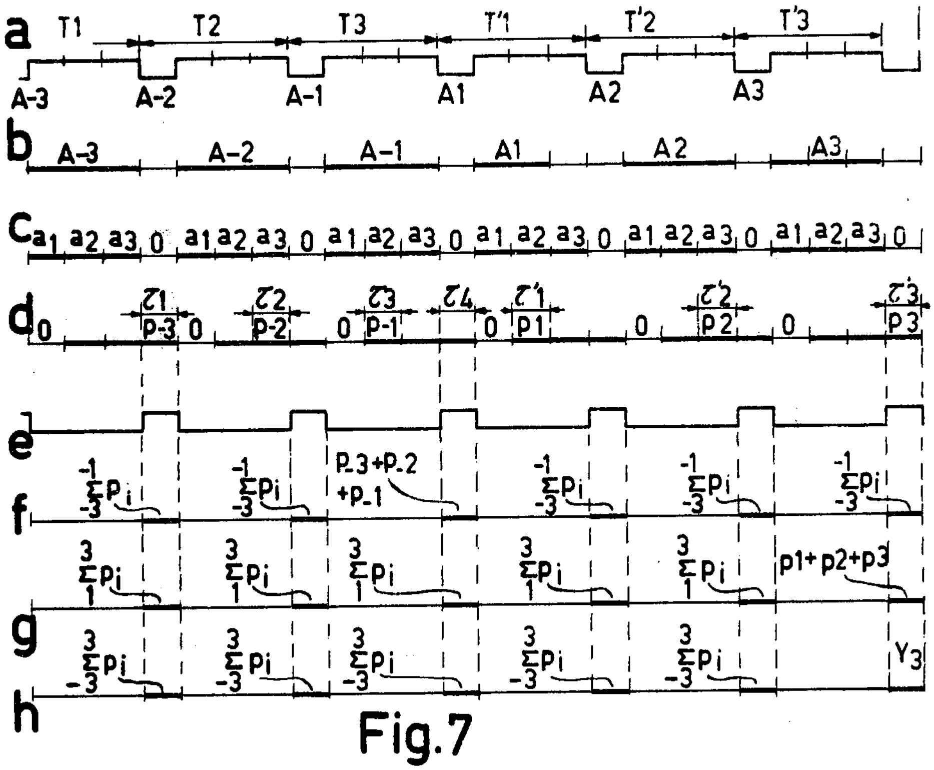
FIG. 7 shows diagrams illustrating the operation of the device shown in FIG. 6.

With reference to the diagram of FIG. 7 it will now be shown that the device shown in FIG. 6 permits of obtaining at its output 2 digits resulting from the operation defined by formula (3). As in the foregoing it will be assumed that the digits entering at 1 appear with the period T. In formula (3), for example, N = 3 so that the output digit to be obtained from the incoming digits $A_{-3}$, $A_{-2}$, $A_{-1}$, $A_1$, $A_2$, $A_3$ and the coefficients $a_1$, $a_2$, $a_3$ is:

$$Y_3 = A_{-3}a_3 + A_{-2}a_2 + A_{-1}a_1 + A_1a_1 + A_2a_2 + A_3a_3 \qquad (4).$$

The diagram 7*a* shows the first control-signal $E_1$ and the width intervals T/4 associated with the periods $T_1$, $T_2$, $T_3$, $T_1'$, $T_2'$, $T_3'$, during which the incoming digits $A_{-3}$, $A_{-2}$, $A_{-1}$, $A_1$, $A_2$, $A_3$ are inserted into the register 6.

The diagram 7*b* shows the intervals during which the same incoming digits appear at the input 15 of the multiplier 4.

The diagram 7*c* shows the intervals during which the coefficients $a_1$, $a_2$, $a_3$ appear at the input 12 of multiplier 4.

The diagram 7*d* shows in a similar manner as the diagrams 3*d* and 5*d* the multiplication intervals also delayed by T/4 with respect to the intervals indicated in FIGS. 7*b* and 7*c*. In these multiplication intervals are especially indicated the width intervals T/4, during which at the first inputs of the adders 17*a* and 17*b* appear the different products, the sum of which constitutes the output digit to be obtained in accordance with formula (4). The products $p_{-3}=A_{-3}a_3$, $P_{-2}=A_{-2}a_2$, $P_{-1}=A_{-1}a_1$ appear at the first input 16*a* of the adder 17*a* during the intervals $\tau_1$, $\tau_2$, $\tau_3$. The products $p_1=A_1a_1$, $p_2=A_2a_2$, $p_3=A_3a_3$ appear at the first input 16*b* of the adder 17*b* during the intervals $\tau'_1$, $\tau'_2$, $\tau'_3$. It should be noted that the intervals $\tau_1$, $\tau_2$, $\tau_3$ are relatively shifted by 3T/4 like the intervals of the same references in diagram 3*d*. The intervals $\tau'_1$, $\tau'_2$, $\tau'_3$ are relatively shifted by 5T/4 like the corresponding intervals in diagram 5*d*.

The diagram 7*e* shows the second control-signal $E_2$, which actuates the inverter contacts 36, 39 and 40. The width intervals T/4 during which this signal $E_2$ is "1" coincide with the intervals of FIG. 7*a*, during which the incoming digits are introduced into register 6.

It will first be assumed that in the device shown in FIG. 6 the two loops 35 and 38 operate independently of one another, which means that the connection between the output 37 of the first loop and the inverter contact 40 of the second loop is interrupted. It is furthermore assumed that the output 33*b* of register 31*b* is constantly connected to the input 34*b* of register 32*b*.

In the first loop 35 the registers 31*a* and 32*a* produce delays of 2*T*/4 and *T*/4 respectively. These are the conditions serving to explain the operation of the device shown in FIG. 4 with reference to the diagrams of FIG. 3. The second control-signal $E_2$ of FIG. 7*e* is shifted with respect to the first control-signal $E_1$ in the same manner as the second control-signal of FIG. 3*i*. Consequently, during the intervals in which the second control-signal is "1" the sum of three products corresponding to three incoming digits are obtained at the output 37 of the loop 35. These sums are indicated in diagram 7*f* and are noted as $$\sum_{-3}^{-1} p_i.$$

Particularly, during the interval $\tau_4$ plotted with respect to the intervals $\tau_1$, $\tau_2$, $\tau_3$ in the same manner as in FIG. 3 the digit $p_{-3}+p_{-2}+p_{-1}$ is obtained.

In the second loop 38, assumed to be isolated from loop 35, the overall delay produced by registers 31*b* and 32*b*, assumed to be constantly connected to one another, is 5T/4. These are, therefore, the conditions serving to explain the operation of the device shown in FIG. 1 with reference to the diagrams of FIG. 5. The second control-signal $E_2$ of FIG. 7*e* is shifted with respect to the first control-signal $E_1$ in the same manner as the second control-signal of FIG. 5*E*. Hence, during the intervals in which the second control-signal is "1", the sum of three products corresponding to three incoming digits is obtained at the output 2 of the loop 38. These sums are indicated in diagram 7*g* and noted:

$$\sum_{1}^{3} p_i.$$

Specifically, during the interval $\tau'_3$ which is situated relatively to the intervals $\tau'_1$, $\tau'_2$ in the same manner as shown in FIG. 5 the digit $p_1+p_2+p_3$ is obtained.

In fact the two loops 35 and 38 do not operate in relatively isolated fashion: they have the aforesaid connected between the terminal 37 and the inverter contact 40 arranged between the registers 31*b* and 32*b*. Moreover, the registers 32*b* and 32*b* produce a delay of 3T/4 and 2T/4 respectively so that it will be apparent that the digit $p_{-3}+p_{-2}+p_{-1}$ appearing during the interval $\tau_4$ at the output 37 of the first loop (FIG. 7*f*) is applied simultaneously by the inverter contact 40 in the position $h_3$ to the input 34*b* of register 32*b*. Owing to the delay 2T/4 produced by register 32*b* the digit $p_{-3}+p_{-2}+p_{-1}$ appears at the second input 18*b* of the adder 17*b* during the interval $\tau'_1$. During this interval $\tau_1$ the digit $p_1$ appears at the first input 16*b* of said adder and at the same time the digit $(p_{-3}+p_{-2}+p_{-1})+p_1$ appears consequently at the output 19*b* of the adder. It will now be obvious that during the interval $\tau'_3$ the digit appearing at the output 2 of the digital filter is the desired output digit: $Y_3=(p_{-3}+p_{-2}+p_{-1})+(p_1+p_2+p_3)$. The diagram 7*h* thus shows the digits obtained at the output 2 of the digital filter of FIG. 6. Opposite the interval $\tau'_3$ there is indicated the sum corresponding to $Y_3$. Opposite the other intervals in which the second control-signal $E_2$ is "1" the notation $$\sum_{-3}^{+3} p_i$$

indicates that the output digits obtained are the sum of six products corresponding to six incoming digits.

As is shown for the devices of FIGS. 1 and 4, the inverter contacts in a device of the type shown in FIG. 6 may, of course, be positioned at other areas of the loops 35 and 38 for a suitable second control-signal.

So far it has been shown that the various variants of the digital filter embodying the invention are appropriate for processing incoming digits at the frequency 1/T associated with a single sequence and to supply output digits at the frequency 1/T associated with one sequence and resulting each from the sum of N incoming digits multiplied by coefficients. The same diagrams apply when the digits entering at the frequency K/T are associated with K elementary sequences of time-multiplexed digits and when it is desired to obtain output digits at the frequency K/T associated with K elementary sequences of time-multiplexed digits.

By way of example, the operation of the device shown in FIG. 1 will be explained for the simple case in which the incoming digits at the frequency 2/T are associated with two elementary sequences. As in the foregoing it will be assumed that the sum to be made corresponds to three digits.

In accordance with the foregoing notation three incoming digits of a first elementary sequence are designated $A_1^1$, $A_2^1$, $A_3^1$ and three incoming digits of the second elementary sequence by $A_1^2$, $A_2^2$, $A_3^2$. Maintaining the same notation for the coefficient the output digit relating to the three digits of the first sequence has to be:

$$Y_4 = A_1^1a_1^1 + A_2^1a_2^1 + A_3^1a_3^1. \quad (5)$$

The output digit relating to the three digits of the second sequence has to be:

$$Y_5 = A_1^2a_1^2 + A_2^2a_2^2 + A_3^2a_3^2. \quad (6)$$

The digits at the output of the digital filter have to appear at the frequency 2/T and to be associated with two time-multiplexed elementary sequences. For example, the two digits $Y_4$ and $Y_5$ associated with said elementary sequences respectively have to be relatively shifted by T/2.

According to the invention the register 22 of FIG. 1 produces a delay equal to T − T/K·1/N + 1 or 7/8T in the present example, in which K = 2 and N = 3 or a delay equal to T + T/K·1/N + 1, or 9/8T.

Figure 8:
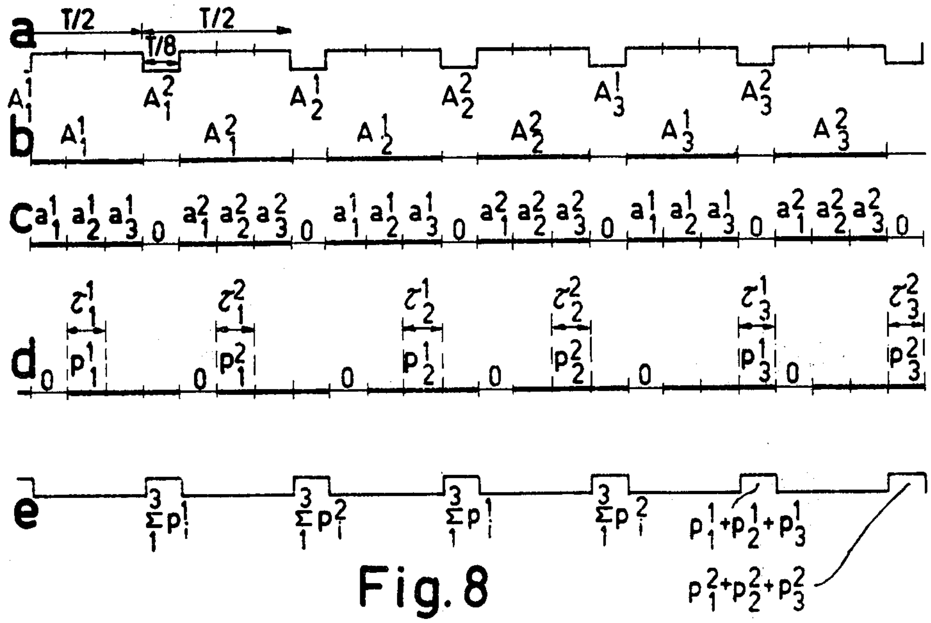
FIG. 8 shows diagrams illustrating the operation of the device shown in FIG. 1 for the case in which the incoming digits are associated with several elementary circuits.

On the base of a register 22 producing a delay of 9/8T the operation of the device shown in FIG. 1 will be explained by way of example with reference to the diagrams of FIG. 8.

The diagram 8*a* shows the first control-signal $E_1$ having a period T/2. In each period T/2 said signal $E_1$ assumes four logical values of a duration T/K·1/N + 1 of T/8 in the present example. For the duration of the first logical value of each period, in which said control-signal is "0" there are introduced into the register 6 the six successive incoming digits $A_1^1$, $A_1^2$, $A_2^1$, $A_2^2$, $A_3^1$, $A_3^2$ associated with the first and the second elementary sequences respectively.

The diagrams 8*b* and 8*c* show the intervals corresponding to the duration of the three other logical values of each period T/2. During these intervals the first control-signal $E_1$ is "1". The diagram 8*b* shows in particular the intervals during which the six incoming digits mentioned above appear at the input 15 of multiplier 4. The diagram 8c shows in particular the intervals during which the coefficients $a_1^1$, $a_2^1$, $a_3^1$ corresponding to the first elementary sequence and the coefficients $a_1^2$, $a_2^2$, $a_3^2$ corresponding to the second elementary sequence appear at the input 12 of the multiplier 4.

The diagram 8*d* shows in solid lines the multiplication intervals during which the product of the digits and the coefficients appear at the first input 16 of the adder 17. Taking into account the time T/8 required for multiplication, these multiplication intervals are lagging behind by T/8 with respect to the intervals of diagrams 8*b* and 8*c*. Between these multiplication intervals the digit at the input 16 of the adder 17 is "0".

Within the multiplication intervals are indicated the intervals $\tau_1^1$, $\tau_2^1$, $\tau_3^1$ during which the products $p_1^1 = A_1^1a_1^1$, $p_2^1 = A_2^1a_2^1$, $p_3{}^1 = A_3^1a_3^1$, the sum of which has to be formed to obtain the digit $Y_4$ of formula (5), appear at the input 16 of the adder. These intervals $\tau_1^1$, $\tau_2^1$, $\tau_3^1$ are relatively shifted by 9/8T. Also the intervals $\tau_1^2$, $\tau_2^2$, $\tau_3^2$ are indicated, during which at the input 16 of the adder appear the products $p_1^2 = A_1^2a_1^2$, $p_2^2, = A_2^2a_2^2$ , $p_3^2 = A_3^2a_3^2$ , the sum of which has to be formed in order to obtain the digit $Y_5$ of formula (6). These intervals $\tau_1^2$, $\tau_2^2$, $\tau_3^2$ are also relatively shifted by 9/8T.

The diagram 8*e* shows the second control-signal $E_2$. In each of the periods $T_2$ the signal $E_2$ assumes four logical values of the duration T/8. The intervals corresponding to the first logicalvalue of each period and during which the second control-signal $E_2$ is "1" coincides with the intervals shown in diagram 8*a*, during which the incoming digits are introduced in register 6.

Since the intervals $\tau_1^1$, $\tau_2^1$, $\tau_3^1$, during which at the first input 16 of the adder appear the products $p_1^1$, $p_2^1$, $p_3^1$, are relatively shifted by 9T/8 and since the register 22 produces a delay equal to 9T/8, it may be shown by an explanation similar to that illustrated by FIG. 5 that during the interval $\tau_3^1$ at the output 2 of the numerical filter there appears the sum $p_1^1 + p_2^1 + p_3^1$, which is the digit $Y_4$ of formula (5). Likewise, since the intervals $\tau_1^2$, $\tau_2^2$, $\tau_3^2$, during which at the first input 16 of the adder appear the products $p_1^2$, $p_2^2$, $p_3^2$, are relatively shifted by 9T/8 and since the register 22 produces a delay of 9T/8 , it may be shown that during the interval $\tau_3^2$ the sum $p_1^2 + p_2^2 + p_3^2$, which is the digit $Y_5$ of formula (6) appears at the output 2 of the numerical filter. The digits $Y_4 + Y_5$ obtained are relatively shifted by T/2. For all other intervals in which the second control-signal $E_2$ is "1", there appears alternately at the output 2 of the digital filter digits corresponding like $Y_4$ to the first elementary incoming sequence (indicated by $$\sum_1^3 p_i^1$$

on diagram 8*e*) and digits corresponding like $Y_5$ to the second incoming elementary sequence (noted $$\sum_1^3 p_i^2).$$

At output 2 are obtained the output digits at the frequency 2/T associated with two time-multiplexed elementary sequences.

It can be shown by this second mode that the other variants of the digital filter according to the present invention described with reference to FIGS. 4 and 6 are suitable for processing K sequences of time-multiplexed digits.

As stated above, the filter according to the present invention constitutes a non-recursive digital filter, if the incoming digits are encoded samples of K analog signals and if the coefficients are the values of the pulse responses corresponding to the filtering operation to be carried out on the K signals. FIGS. 1, 4 and 6 show clearly that the invention permits of obtaining a non-recursive filter by a reduced number of elementary circuits and connections.

The filter according to the invention may also be employed in a recursive digital filter. It can be seen, for instance, on page 2 to 13 of the book of Gold and Rader, especially from FIG. 2–19, page 40 that a recursive filter can be formed in direct form with the aid of a first arithmetical member connected to the input of the filter and supplying the sums of the incoming digits multiplied by first coefficients and with the aid of a second arithmetical member connected to the output of the filter and supplying the sums of the output digits multiplied by second coefficients. By combining in an adder the digits supplied from the first and second filters the output digits of the filter are obtained. The first and second arithmetical members may be formed by digital filters embodying the invention.

The filters according to the invention may furthermore be employed in digital circuits of the phase-shifting type, interpolating type, etc., in which calculations of the same type as those of digital filters have to be carried out.

What is claimed is:

1. A digital filter comprising:

input means for supplying a sequence of signals of predetermined frequency;

coefficient generator means for supplying a sequence of predetermined coefficients;

multiplier means having a first input connected to said input means, and a second input connected to said coefficient generator means, and an output having an output signal thereon representing the product of the signals on said first and said second inputs;

delay means for producing a predetermined time delay, and having an input and an output;

adding means having a first input connected to said output of said multiplier means and a second input connected to said output of said delay means, and having an output connected to said input of said delay means; and control means for controlling the connection between said output of said adding means and said input of said delay means.

2. A digital filter as defined in claim 1, wherein said sequenc of signals has a frequence of K/T, and is derived from the time-multiplexing of K elementary sequences each having a frequency of 1/T.

3. A digital filter as defined in claim 2, wherein said sequenc of signals are encoded samples of K analog signals to be filtered, said coefficients are sample values of a predetermined filtering function to be applied to said analog signals, and said output of said adder producing encoded samples of the filtered K signals.

4. A digital filter as defined in claim 1, wherein said coefficient generator means comprises a shift register.

5. A digital filter as defined in claim 1, wherein said control means comprises and AND-gate having first and second inputs and an output, said first input being connected to said output of said adding means, and said output being connected to said input of said delay means.

6. A digital filter as defined in claim 5, wherein said control means further comprises an inverter gate having an input and an output and a control signal source, said control signal source being connected to said input of said inverter gate, and wherein said output of said inverter gate is connected to said second input of said AND-gate.

7. A digital filter as defined in claim 1, wherein said delay means comprises two discrete delay circuits, each of said circuits having an equal time delay.

8. A digital filter as defined in claim 1, wherein said delay means produces a delay differing from time T by an amount $$\Theta = \frac{T}{K} \cdot \frac{1}{N+1}$$

where K is the number of elementary sequences, and N is a predetermined positive integer.

9. A digital filter as defined in claim 1, wherein said adding means comprises a first and second adder, and wherein said delay means comprises first and second delay devices operatively associated with said first and second adders respectively for producing first and second predetermined different time delays.

* * * * *

UNITED STATES PATENT AND TRADEMARK OFFICE

CERTIFICATE OF CORRECTION

PATENT NO. : 3,930,147

DATED : December 13, 1975

INVENTOR(S) : MAURICE GEORGES BELLANGER ET AL

It is certified that error appears in the above-identified patent and that said Letters Patent are hereby corrected as shown below:

Column 1, line 24, "same" should be --sample--

Column 4, line 10, the formula should read as follows:

$$\theta = \frac{T}{K} \cdot \frac{1}{N+1}, \text{ for a given N.}$$

Claim 2, line 2, "frequence" should be --frequency--

Claim 3, line 2, "sequenc" should be --sequence--

Claim 5, line 2, after "comprises" "and" should be --an--

Signed and Sealed this

Third Day of August 1976

[SEAL]

*Attest:*

RUTH C. MASON
*Attesting Officer*

C. MARSHALL DANN
*Commissioner of Patents and Trademarks*